United States Patent
Bridger et al.

(10) Patent No.: US 6,272,209 B1
(45) Date of Patent: Aug. 7, 2001

(54) LIFELINE TELEPHONY PROVISION FOR VOICE OVER DIGITAL SUBSCRIBER LINE

(75) Inventors: Mark Bridger, Hertford Heath; Michael F Grant, Bishop's Stortford; Roger J Williamson, Much Hadham; Christopher Tate, Bishop's Stortford; Andrew D Wallace, Harlow; Jeffrey Farrington, Dunmow, all of (GB)

(73) Assignee: Nortel Networks Limited, Quebec (CA)

( * ) Notice: Subject to any disclaimer, the term of this patent is extended or adjusted under 35 U.S.C. 154(b) by 0 days.

(21) Appl. No.: 09/374,805

(22) Filed: Aug. 16, 1999

(51) Int. Cl.[7] ...................................................... H04M 1/24
(52) U.S. Cl. .................................. 379/27; 379/1; 379/9; 379/15; 379/29; 379/32
(58) Field of Search .................................. 379/1, 2, 8, 9, 379/10, 15, 23, 24, 27, 28, 32, 34, 93.05, 93.06, 93.09, 100.15, 100.16, 387, 399, 413

(56) References Cited

U.S. PATENT DOCUMENTS

| | | | |
|---|---|---|---|
| 5,142,571 | * | 8/1992 | Suzuki et al. ........................ 379/279 |
| 5,216,704 | * | 6/1993 | Williams et al. .................. 379/93.01 |
| 5,220,597 | * | 6/1993 | Horiuchi ................................ 379/362 |
| 5,305,377 | * | 4/1994 | D'Arcy et al. ........................ 379/399 |
| 5,483,574 | * | 1/1996 | Yuyama .................................. 379/32 |
| 5,581,612 | * | 12/1996 | Nishikawa ............................ 379/387 |
| 5,883,941 | | 3/1999 | Akers ................................ 379/93.08 |
| 5,889,856 | * | 3/1999 | O'Toole et al. ...................... 379/399 |
| 5,912,957 | * | 6/1999 | Park ...................................... 379/165 |
| 6,088,362 | * | 7/2000 | Turnbull et al. ...................... 370/442 |
| 6,141,330 | * | 10/2000 | Akers .................................... 370/264 |
| 6,141,356 | * | 10/2000 | Borman ................................. 370/493 |

FOREIGN PATENT DOCUMENTS 2 313 979    12/1997    (GB) ............................ H04M/11/06

* cited by examiner

*Primary Examiner*—Curtis Kuntz
*Assistant Examiner*—Binh K. Tieu
(74) *Attorney, Agent, or Firm*—Lee, Mann, Smith, McWilliams, Sweeney and Ohlson (57) ABSTRACT

A method, apparatus, and software for providing lifeline service during power failure affecting Customer Premises Equipment (CPE) in a Digital Subscriber Loop (DSL) arranged to carry voice traffic in band rather than on a separate analogue POTS band. The arrangement provides a reduced service, capable of supporting at least one voice call, to operate during such power failure and, where a single call is in progress during power failure, that call may be maintained during the transition from DSL to analogue POTS lifeline service. Where a call is in progress upon power restoration, the lifeline POTS service may be maintained until completion of the call so as not to interrupt a potential lifeline call.

14 Claims, 5 Drawing Sheets

LIFELINE TELEPHONY PROVISION FOR VOICE OVER DIGITAL SUBSCRIBER LINE

FIELD OF THE INVENTION

The present invention relates to a method and apparatus for provision of lifeline telephony for a Voice over Digital Subscriber Line and a system incorporating the same.

BACKGROUND TO THE INVENTION

Digital Subscriber Line (DSL) modem technology has enabled the transmission of digital information at duplex rates from 144 Kbits/s to greater than 1 Mbits/s over the subscriber loop. The demand for additional telephone lines and integrated telephony and data services has given rise to Voice over DSL (VoDSL) solutions. For example a VoDSL system may provide 4 voice channels carried within the digital data over a single twisted pair subscriber loop from a Line Terminating Equipment (LTE) located in the Central Office to a Customer Premises Equipment (CPE). In one implementation, a VoDSL system carries the voice channel (s) in band as encoded data within the data stream and therefore there is no baseband POTS (Plain Old Telephony Service) as would be the case with for example ADSL or G.Lite. Unlike normal telephony the derived voice method of VoDSL requires local power at the CPE to perform the modulation and demodulation.

Conventional analogue POTS telephony over a twisted pair to the LTE has the benefit that during power failure at the customer premises emergency calls can still be placed since the line and the handset at the customer premises are powered from the central office. A disadvantage of existing VoDSL modems is that the amount of power required for normal operation could severely limit the operational loop length if power is fed from the central office and thereby not provide a service able to reach the majority of consumers. This has limited deployment of VoDSL systems to subscribers having an additional conventional POTS line which can be used in the event of power failure. Absence of support for lifeline services has therefore severely hindered deployment into the small business and especially the residential market.

Power feed from LTE has been tried for Integrated Services Digital Network (ISDN) but it requires very high battery voltages and severely limits the operational loop length.

Use of batteries at the CPE to provide backup power in the event of power failure presents other problems. Batteries may be bulky and therefore unattractive to subscribers. Batteries require periodic maintenance to ensure reliability; and battery faults may not be detected until a local power failure occurs and they then fail to provide power to the CPE and hence provide lifeline support, thus defeating the object of their presence in the system.

OBJECT OF THE INVENTION

The invention seeks to provide an improved method and apparatus whereby to provide a voice lifeline service for a Voice over DSL system.

SUMMARY OF THE INVENTION

According to a first aspect of the invention, there is provided a method of operating customer premises equipment for a voice over digital subscriber loop (VoDSL) system comprising at least one local telephony port and a subscriber loop port, the method comprising the steps of:
connecting said at least one local telephony port directly to said subscriber loop port responsive to detection of a customer premises equipment power supply failure; whereby to enable direct communication between said at least one local telephony port and said subscriber loop port so as to maintain at least a voice service to the customer.

Advantageously, the method allows lifeline voice service to be provided by a LTE VoDSL modem arrangement.

Advantageously, upon loss of VoDSL capability to the CPE, lifeline voice service operation is achieved by an automatic change of the method of transmitting voice from VoDSL to POTS. To provide lifeline service the LTE modem is automatically reconfigured from a VoDSL modem to a POTS subscriber line interface.

Advantageously, when the LTE re-establishes VoDSL capability with the CPE, the LTE is automatically reconfigured from a POTS Subscriber line interface to a VoDSL modem.

Advantageously, the LTE will interwork with any standard POTS device.

Advantageously, the LTE is capable of being reconfigured so as to emulate a POTS line card or an analogue or ISDN modem.

Advantageously, the CPE modem may be disconnected or removed and lifeline calls to be made by connection of a POTS device to the subscriber's port.

According to another aspect of the invention, there is provided a method of operating line terminating equipment for a voice-over digital subscriber loop comprising a subscriber loop port, and comprising the steps of:
sending and receiving digital subscriber loop signals via said subscriber loop port;
receiving an indication at said subscriber loop port of a change of operational mode of customer premises equipment connected to said subscriber loop port from a digital subscriber loop to analogue POTS loop;
operating said line termination equipment in an analogue POTS mode responsive to receipt of said indication.

The invention is also directed to a method by which the described apparatus operates and including method steps for carrying out every function of the apparatus.

According to another aspect of the invention, there is provided a line terminating equipment comprising a subscriber loop port and a network connection port; a voice-over digital subscriber loop modem circuit; and a direct electrical connection circuit; the equipment being arranged to operate in a first mode wherein a telecommunications connection is maintained between said subscriber loop port and said network connection port via said voice-over digital subscriber loop modem, and in a second mode wherein a telecommunications connection is formed between said subscriber loop port and said network connection port via said direct electrical connection.

According to a further aspect of the invention, there is provided a customer premises equipment comprising a subscriber loop port and at least one local telephony port; a voice-over digital subscriber loop modem circuit; and a direct electrical connection circuit; the equipment being arranged to operate in a first mode wherein a telecommunications connection is maintained between said subscriber loop port and said at least one local telephony port via said voice-over digital subscriber loop modem, and in a second mode wherein a telecommunications connection is formed between said subscriber loop port and said local telephony port via said direct electrical connection.

The invention also provides for a system for the purposes of digital signal processing which comprises one or more instances of apparatus embodying the present invention, together with other additional apparatus.

The preferred features may be combined as appropriate, as would be apparent to a skilled person, and may be combined with any of the aspects of the invention.

BRIEF DESCRIPTION OF THE DRAWINGS

In order to show how the invention may be carried into effect, exemplary embodiments of the invention will now be described below by way of example only and with reference to the accompanying figures in which.

DETAILED DESCRIPTION OF INVENTION

Figure 1:
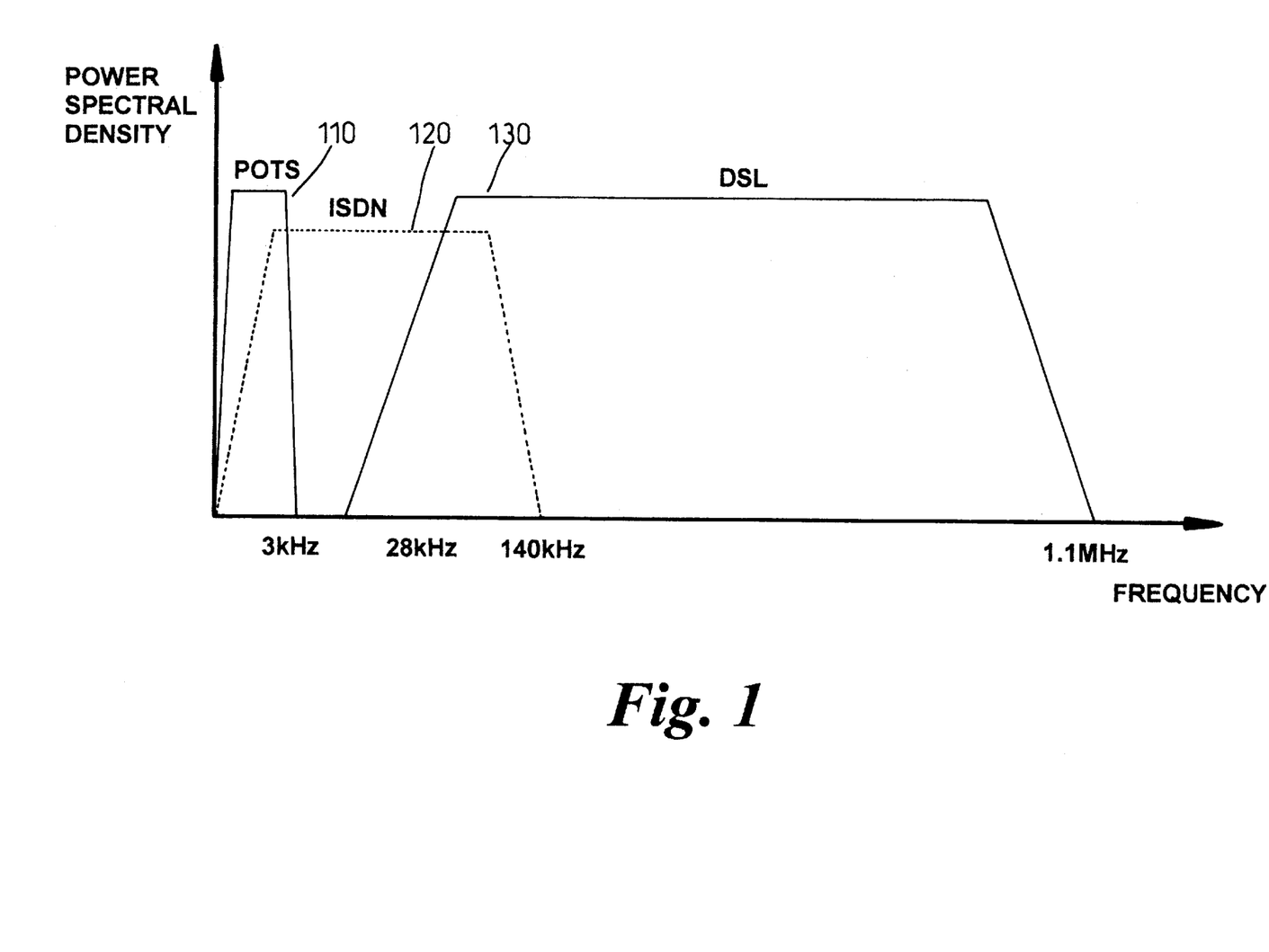
FIG. 1 shows an example allocation of frequencies to analogue POTS, ISDN, and DSL according to the prior art.

Referring to FIG. 1 there is shown a graph of Power Spectral Density (PSD) against frequency for POTS 110, ISDN 120, and DSL 130 systems. A typical PSD for each of these is shown, with analogue POTS being transmitted in the band up to 3 kHz, ISDN transmitted in a range up to about 140 kHz, and DSL transmitted in the frequency range 28 kHz up to 1.1 MHz. In the case of DSL systems the separation of the transmission bands for POTS and DSL enables both analogue POTS and DSL communication simultaneously without mutual interference. However the separation required between the upper limit of the POTS band and the lower limit of the DSL band gives rise to wasted bandwidth, as does the total bandwidth occupied by the single POTS channel transmitted in analogue form as against a corresponding voice channel transmitted over DSL.

Figure 2:
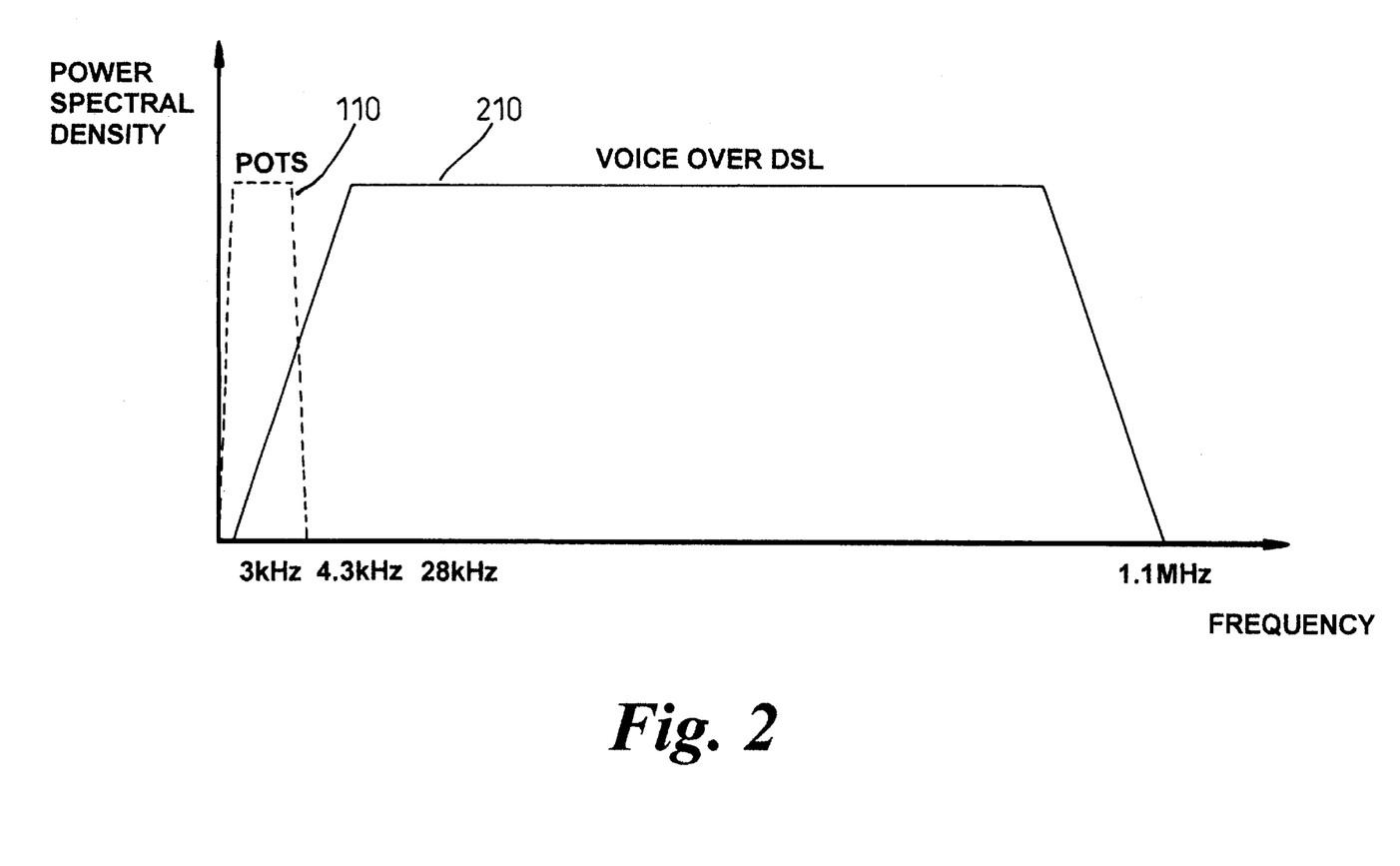
FIG. 2 shows an example allocation of frequencies to Voice over DSL in normal mode and to analogue POTS in lifeline mode according to the present invention.

Referring now to FIG. 2, there is shown a graph of PSD against frequency 210 for a VoDSL system in accordance with the present invention. In this arrangement in normal operation, no bandwidth is allocated for analogue POTS transmission. Instead an extended band from approximately 4.3 kHz up to 1.1 MHz is allocated for DSL, the additional bandwidth made available by omitting POTS being capable of carrying several voice channels. The graph also shows for reference the location of the conventional analogue POTS band 110 up to 3 kHz.

The invention herein describes a system whereby a lifeline voice service to the consumer is maintained in the event of local power failure. This system does not require power feed, other than conventional POTS battery feed, to the CPE nor does it place any additional constraints on loop length.

The system operates when the LTE detects that the CPE modem is no longer operating in VoDSL mode. The LTE then reconfigures the VoDSL modem to act as a POTS Subscriber Line Interface and drives the line as a standard POTS line. (The precise method by which a CPE modem is placed into lifeline and the methods of signalling/detection of this mode are described below).

Figure 3:
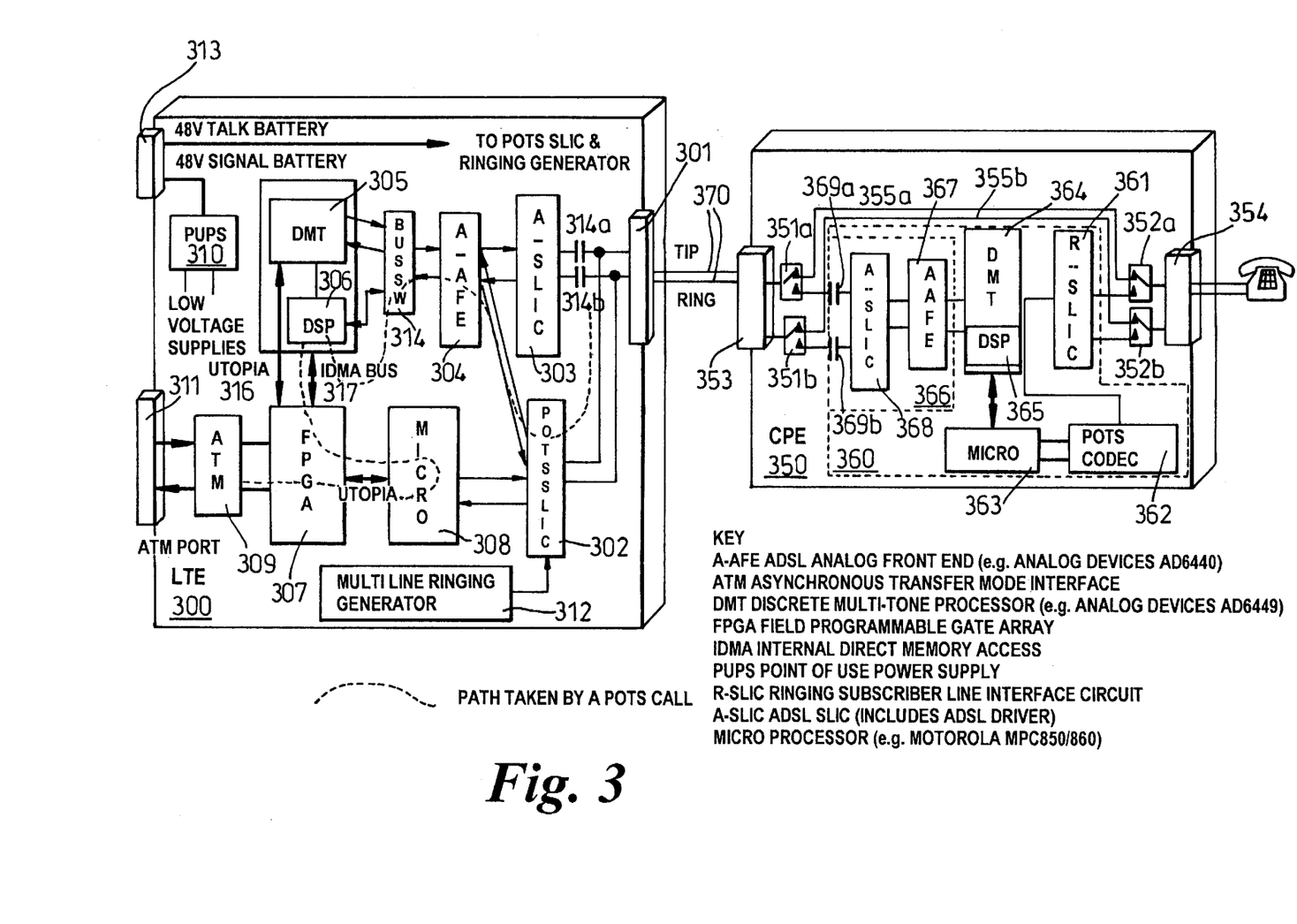
FIG. 3 shows a first example arrangement of CPE and LTE according to the present invention.

Referring now to FIG. 3, there is shown a subscriber loop arrangement comprising LTE 300 at the central office and CPE 350 at a subscriber's premises. The CPE comprises a VoDSL modem 360, two pairs of switches 351a–b, 352a–b, a subscriber loop port 353, a local telephony port 354, and a pair of direct paths 355a–b between the two switches. The VoDSL modem and the direct paths are arranged in parallel between the switchable contacts of the two pairs of switches. The non-switchable contacts of the two pairs of switches are connected to the subscriber loop port and the local telephony port respectively. The switches are each arranged so that in normal operation the VoDSL modem is connected between the two ports 353, 354, whilst on a loss of local power to the equipment, both switches automatically revert to the position in which the direct paths are connected between the two ports. Relays would be appropriate switches to achieve this effect.

The VoDSL modem itself comprises ringing subscriber line interface circuit (R-SLIC) 361, POTS coder/decoder (POTS CODEC) 362, a processor 363 (for example Motorola MPC850/860 PowerPC™), Discrete MultiTone modem 364 (DMT) incorporating a Digital Signal Processing (DSP) 365 capability, an ADSL Analogue Front End 366 incorporating coder/decoder functions (A-AFE) 367, an ADSL subscriber line interface circuit (A-SLIC) 368 (including an ADSL driver), and a pair of high pass filters 369a–b (for example shown symbolically as a capacitor). The functional components listed above are connected in series in the order listed between the pair of switches connected to the local telephony port and the pair of switches connected to the subscriber loop port.

Turning now to the LTE 300 at the central office, this comprises a subscriber loop port 301, a POTS Subscriber line interface circuit (SLIC) 302, and in parallel an A-SLIC 303 (including an ADSL driver), an ADSL Analogue Front End 304, (A-AFE), a pair of high-pass filters 314a–b (shown symbolically as capacitors) in series with incorporating coder/decoder functions Discrete MultiTone modem (DMT) 305 incorporating a Digital Signal Processing (DSP) 306 capability, a Field Programmable Gate Array (FPGA) 307, a processor 308 (for example Motorola MPC850/860 PowerPc™), an asynchronous transfer mode (ATM) interface 309, a Point-of-Use Power Supply (PUPS) 310, an ATM port 311, a multi-line ringing generator 312, and an external power supply interface 313.

The subscriber loop port 353 of the CPE is connected to the subscriber loop port 301 of the LTE by a twisted copper pair 370 subscriber loop.

In normal operation as VoDSL modem the operational parts of the LTE are connected as follows.

The ATM port 311 is connected to the ATM interface 309 by means of a standard ATM physical layer interface such as ATM 25.6 Mbits/s. The ATM interface connects to the FPGA 307 by means of a standard ATM parallel interface such as UTOPIA 316. The FPGA connects to the DMT modem 305 also by means of a UTOPIA interface. The DSP within the DMT modem logically connects to the microprocessor 308 by means of a parallel microprocessor bus (for example IDMA bus) 317, but physically signals are routed via the FPGA 308 to provide the necessary glue logic. The processor 307 is also connected to the FPGA by means of a UTOPIA interface. The DMT modem connects to the A-AFE 304 via separate receive and transmit data buses connected via digital bus switches 314. The AAFE connects to the A-SLIC by means of receive and transmit analogue differential pairs. The A-SLIC connects to the line 370 by means of a two wire differential pair via line interface 301 and the pair of high pass filters 314a–b.

In normal operation data and voice is carried within ATM cells, using the data ATM Adaption layer 5 (AAL5) and the voice using ATM adaption layer 2 (AAL2).

The ATM interface 309 provides a connection between the ATM 25.6 Mbits/s physical port and a parallel UTOPIA port on the FPGA.

The FPGA 307 provides the cell buffering necessary to adapt the rates of cell arrival and departure to the rate of transmission of those cells. It also provides glue logic.

The fundamental parts of a DMT modem for ADSL are given in the prior art T1.413 or ITU G.992.1.

In the transmit direction, the DMT modem receives ATM cells from the ATM UTOPIA interface 316. It adds error correction redundancy and interleaving to give protection against burst errors. It frames the data with link layer information, then encodes the framed data onto a series of tones in the frequency domain by means of trellis coding. It converts the frequency domain information into time domain information by means of an Inverse Discrete Fourier transform (IDFT). The time domain information is then output to the A-AFE 304 via the digital bus switches 314.

In the receive direction the DMT modem 305 receives time domain information from the A-AFE 304. The information is passed through a time domain equaliser (filter) in order to equalise the channel impulse response. The time domain information is converted to frequency domain information by means of a Discrete Fourier Transform (DFT). The data is extracted from the series of tones in the frequency domain by a trellis decoder. Link layer information is removed and de-interleaving and error correction are performed. The resulting ATM cells are output to the ATM UTOPIA interface 316.

The DSP performs the procedures necessary to characterise the loop 370 and to train the modems to obtain the best possible performance from the loop.

The A-AFE 304 performs digital to analogue and analogue to digital conversion (codec), filtering, separation of upstream and downstream bands and programmable receive gain.

The A-SLIC 303 performs four wire (receive and transmit pairs) to two wire(subscriber loop) 370 conversion (hybrid), including line driver and line receiver.

The microprocessor 308 performs management functions such as initialising modems, programming initial parameters into modems and collection of statistics.

The POTS SLIC 302 performs no function during normal VoDSL mode and may be isolated.

Similarly, the Ringer Generator 312 performs no function in this mode and may be isolated.

In Lifeline mode the VoDSL modem is connected as follows.

The ATM port 309 is connected to the ATM interface by means of a standard ATM physical layer interface such as ATM 25.6 Mbits/s. The ATM interface connects to the FPGA 307 by means of a standard ATM parallel interface such as UTOPIA. The FPGA connects to the processor 308 by means of a UTOPIA interface. The DSP 306 within the DMT modem connects to the microprocessor by means of a parallel microprocessor bus (IDMA bus) 317. The DSP modem connects to the A-AFE 304 via memory mapped data bus switched through to separate receive and transmit data buses by the bus switches 314. The A-AFE connects to the POTS SLIC 302 by means of receive and transmit analogue differential pairs. The POTS SLIC connects to the subscriber loop port 301 by means of a two wire differential pair.

The A-SLIC 303 performs no function during lifeline mode and may be isolated from the subscriber loop port by means of switches or, as in the example illustrated, by a pair of high pass filters 314a–b, and from the A-AFE by means of the bus switches 304.

The microprocessor 308 is connected to the POTS SLIC 302 by means of digital logic signal paths.

The POTS SLIC 302 battery feed, provides over-voltage protection, four wire to two wire conversion (hybrid), ringing control, and supervision (monitoring for off-hook on-hook).

The A-AFE 304 is used as a linear coder/decoder with the sample rate reduced from ADSL 35 MHz to 32 kHz. ADSL filter bands are modified to provide the appropriate bands for POTS.

Digital filtering is employed to provide 13 bit Linear to 8 bit $\mu$-law or A-law PCM coding/decoding. Echo cancelling may also be necessary for packet voice systems.

The DSP also provides silence insertion, fax detect, AAL2 mini-cell generation, packing and unpacking voice samples into/from AAL2 mini cells.

In the receive direction the processor 308 takes AAL2 mini cells of encoded voice generated by the DSP 306 and packs them into ATM cells using an AAL2 Segmentation and Re-assembly function available on the processor. These ATM cells are output to the UTOPIA port.

In the transmit direction the processor 308 unpacks the AAL2 mini-cells from the ATM cells and outputs them via the IDMA bus 317 to the DSP 306. The processor also monitors the supervisory bits from the POTS SLIC 302 for off-hook detect. The processor terminates and generates POTS signalling messages as a proxy for the CPE 350. That is, signalling messages are generated and terminated by the processor as though they were generated and terminated by the CPE as would be the case in normal operation. The processor may also perform dialled digit collection. The processor is also responsible for configuring the POTS SLIC.

The DMT modem performs no function in lifeline mode and may be powered down.

The ringing generator generates a high voltage ringing tone as required that is used to ring the subscriber's telephone.

Operation of the arrangement as a whole is as follows.

The LTE VoDSL modem is connected to the CPE modem 360 over a subscriber loop 370. The LTE VoDSL modem is connected to the network by means of an ATM connection 311. Individual voice channels are carried as AAL2 mini-cells from the network over the VoDSL system to the CPE.

In this example the LTE modem detects that the CPE modem is no longer transmitting data and is therefore no longer VoDSL capable. This loss of VoDSL connection may be detected by a loss of detectable DSL signal at the LTE, or alternatively by receipt of an explicit "last gasp" loss of power signal generated by and received from the CPE. A further preferred signalling method is described below in more detail.

The operation of the VoDSL modem is suspended by removal of the VoDSL signals from the line. The modem is reconfigured to provide POTS subscriber line interface functionality, battery feed for standard POTS devices connected to the subscriber loop, over-voltage and current protection, ringing voltage injection, supervision and detection of off-hook and ring-trip, and coding and decoding of the analogue POTS signals to/from the digital domain.

The LTE modem is arranged then to perform the following tasks:

1. Attempts to re-establish VoDSL capability with the CPE modem. This may be for example implemented in a process whereby the CPE modem responds to a LTE sourced pilot training tone injected on a periodic basis.
2. The modem monitors for conventional CPE initiated OFF-HOOK events so that the user may be the calling party and forms connect messages and collects dialled digits.
3. It monitors for connect request messages from the network so that the user may be the called party and acknowledges those requests
4. It injects ringing signals as requested.
5. It performs voice coding and decoding, echo cancelling, and silence suppression.
6. It generates and terminates AAL2 voice mini-cells as required.
7. It generates and terminates POTS signalling as required.

If the LTE re-establishes VoDSL capability with the CPE modem then the LTE is reconfigured to a VoDSL modem and the POTS signals are removed from the line.

Figure 4:
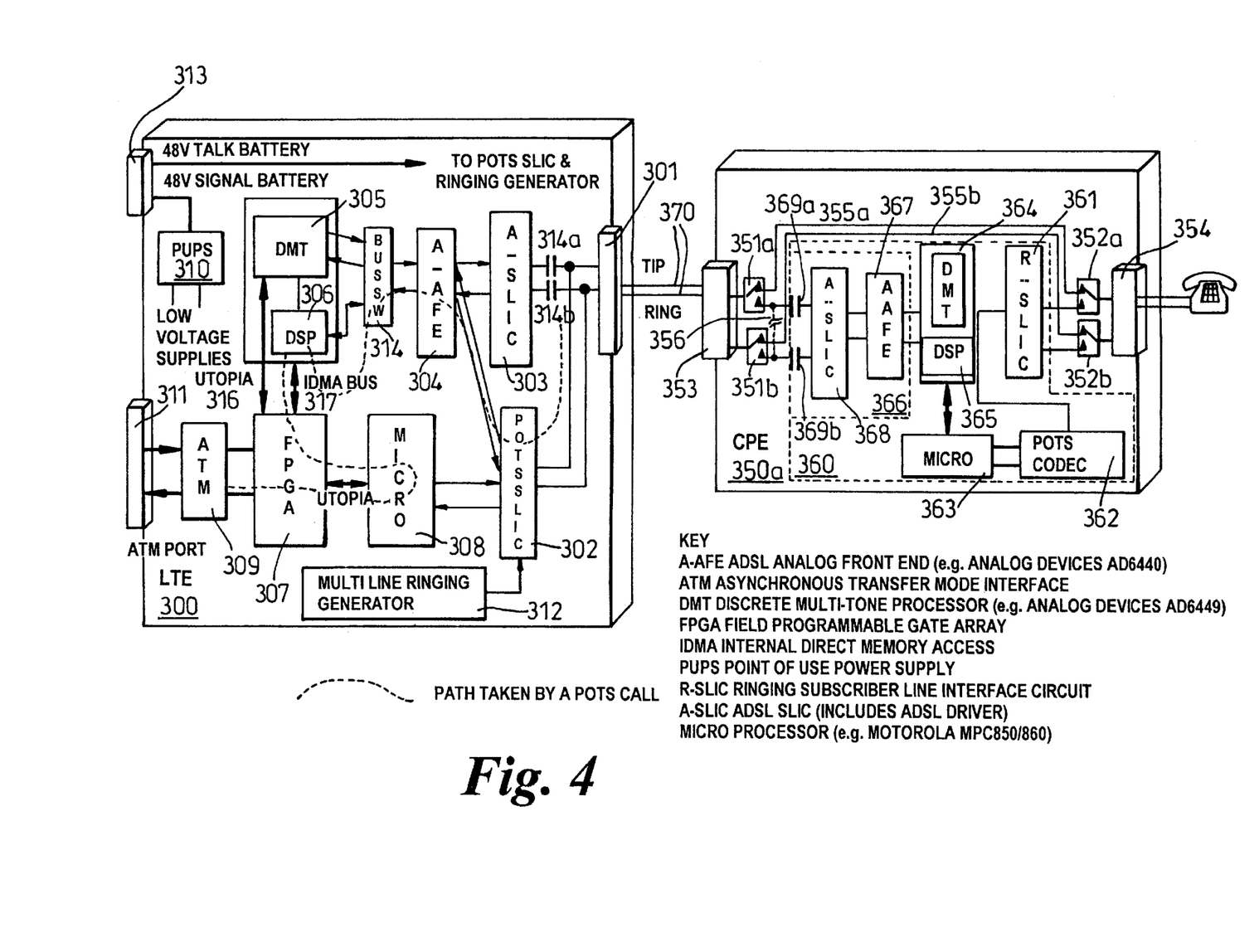
FIG. 4 shows a second example arrangement of CPE and LTE according to the present invention.

Referring now to FIG. 4, there is shown a second embodiment according to the present invention. The arrangement is the same as that of FIG. 3, except for the addition of a DC current sink 356 forming a connection between the path from switch 351a to high pass filter 369a and the path from switch 351b to high pass filter 369b.

To ensure that reliable operation of DSL service, it is necessary to prevent non-ohmic contacts forming at joints in the loop and distorting the signal. This is achieved by supplying some sealing current of about 1–2 mA by applying a voltage on the line at the Central Office. To create a sealing current, there needs to be some form of DC sink at the CPE. By placing this at the input to the CPE modem, it will be behind the switching used to re-route the line through to the telephone on lifeline mode. Thus, when the power goes down at the CPE and the switch changes over to the lifeline position, the sealing current will cease. This is detected at the LTE 300 at the Central Office, in the same way that off-hook is detected and it too goes into lifeline mode. The voltage supplied for sealing becomes the line battery voltage for POTS. When a telephone goes "off hook", the current drawn by the terminal is detected by the Central Office equipment in the usual way. This current will typically be greater than 20 mA and so is distinguishable from the sealing current. Thus when the CPE modem has power restored, the switches will be activated to connect the line to the modem and the current drawn will return to about 1–2 mA. Detection at the Central Office will indicate that the CPE modem has restored power, so it will in turn switch back to DSL mode.

Figure 5:
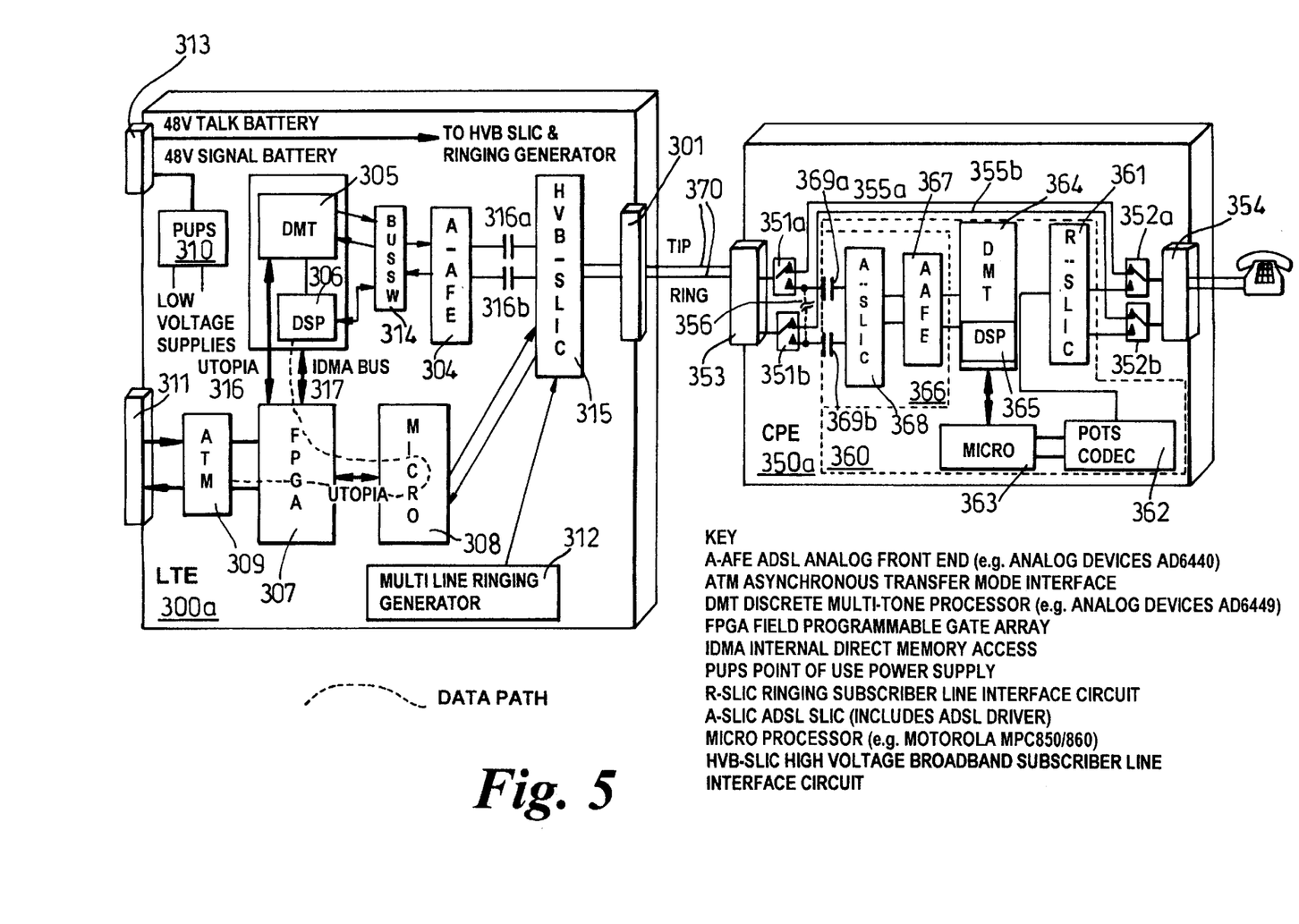
FIG. 5 shows a third example arrangement of CPE and LTE according to the present invention.

Referring now to FIG. 5 there is shown a further example of a system in accordance with the present invention. The arrangement comprises a CPE arrangement 350 identical to that shown in FIG. 4, together with a modified LTE 300a which differs from the LTE arrangements 300 of FIGS. 3 and 4 in that the A-SLIC 303, POTS SLIC 302, high pass filters 314a–b are replaced by a circuit comprising a high voltage broadband subscriber line interface circuit (HVB-SLIC) and a pair of high pass filters 316a–b. In this arrangement the HVB-SLIC performs all of the necessary functions performed by the A-SLIC and POTS SLIC in the earlier embodiments, digitally synthesising the analogue output of the POTS SLIC to the subscriber loop port 301. This arrangement has the advantage of not requiring a separate POTS SLIC at the expense of the additional processing required to generate the synthesised analogue signal.

Whilst the CPE arrangement 350a is shown comprising a DC current sink 356 for signalling power loss to the LTE 300a, the LTE 300a comprising an HVB-SLIC 315 could operate equally well using an alternative signalling method as described above.

Since a power outage at the CPE could be of uncertain duration, it is desirable to maintain the lifeline service, not only during the outage, but also during subsequent power restoration, since re-establishing the POTS over DSL service could take precious time. The present invention also provides a method for such maintenance of calls in progress during CPE power restoration.

The method of supplying lifeline POTS is to use an analogue POTS capable linecard at the Central Office end of the loop. At the CPE, a conventional analogue lifeline telephone is directly connected to the loop via some form of switching. This switching, possibly in the form of relays, is such that, in their un-powered state, the direct connection is made, bypassing the modem. Power is therefore not required to carry the telephony as digital data over the DSL connection. Establishing the lifeline POTS on power outage happens automatically because the switches revert to their un-powered state. The Central Office detects that loss of the link and also switches the line over to the lifeline analogue linecard with its battery feed. Maintaining this state on re-establishing the power to the CPE modem is achieved by only re-powering the switches when the telephones are "on-hook".

The state of the telephone may be measured by directly sensing the voltage on the line. When the line is unused, this voltage is the full line voltage. However, when a telephone goes "off hook", it draws current and the line voltage at the subscriber end drops to about 12V. This voltage is sensed on re-establishing local power to the modem and, if it is below a prescribed value, the lifeline switches are left un-powered so that the call in progress is unaffected. Once the telephone goes "on hook" and the line voltage rises above the prescribed limit, the switches will be activated and the modem will be reconnected to the line to commence training and resume normal VoDSL modem operation.

Another method that can be used to sense the state of the line is to use current sensing. This could be in the form of a small-valued resistor with voltage across it being sensed. When the voltage goes below a prescribed limit the telephone has gone "on hook" and the line switches re-establish the normal modem connection to the line.

Another method would be to use a line-sensing relay in which the coil of the relay is in series with the line and the contacts used to sense the state of the line.

In a further embodiment, the DSP capability of the line card may be exploited to reconfigure the card so as deliver a POTS service to the customer. This reconfiguration is preferably performed under control of the operator and will normally be put into effect when a subscriber moves house and a new occupant of the premises requires only POTS, i.e. no CPE is installed. The reconfiguration may also be put into effect where a subscriber's account is in arrears.

Advantageously, the line card may also be reconfigured to emulate an ISDN modem or a conventional analogue modem, e.g. a 56 kbit/s modem. It will be appreciated that in the latter case, the bandwidth of the ADSL link allows the full 56 kbit/s to be exploited.

Any range or device value given herein may be extended or altered without losing the effect sought, as will be apparent to the skilled person for an understanding of the teachings herein.

What is claimed is:

1. A method of operating voice over digital subscriber line (VoDSL) system comprising line terminating equipment incorporating a first VoDSL modem and coupled via a subscriber loop to customer premises equipment having a subscriber loop port coupled via a second VoDSL modem to a local telephony port so as to provide the customer with a lifeline voice service in the event of a customer premises equipment power supply failure, the method comprising the steps of:

at the line termination equipment, detecting a loss of digital transmission over the subscriber loop from the customer premises equipment, and, in response thereto, reconfiguring the first VoDSL modem as a voice telephony (POTS) interface and providing electrical power to the subscriber loop for operation of the customer premises equipment; and, at the customer premises equipment, responsive to said power supply failure providing a direct connection between said local telephony port and said subscriber loop port so as to enable direct communication between said local telephony port and said subscriber loop port and thereby maintain at least a voice service to the customer.

2. A method according to claim 1 additionally comprising the steps of:

providing an indication at said subscriber loop port responsive to said detecting a power failure;

whereby to communicate with local exchange equipment connected to said subscriber loop port.

3. A method according to claim 2 wherein the step of providing an indication comprises:

effecting a change in a sealing current associated with said subscriber loop port.

4. A method of operating line terminating equipment in a voice over digital subscriber line (VoDSL) system in which the line terminating equipment is coupled via a subscriber loop to customer premises equipment having a subscriber loop port coupled via a VoDSL modem to a local telephony port so as to provide the customer with a lifeline voice service in the event of a customer premises equipment power supply failure, the method comprising the steps of:

sending and receiving digital subscriber signals over the subscriber loop via the subscriber loop port;

receiving an indication from the customer premises equipment of a power supply failure and a reconfiguration of that customer premises equipment to operate in an analogue telephony mode by providing a direct connection between said local telephony port and said subscriber loop port and, in response thereto, reconfiguring the line termination equipment as an analogue voice telephony interface and providing electrical power to the subscriber loop for operation of the customer premises equipment so as to maintain at least a voice service to the customer.

5. A method as claimed in claim 4, and wherein said line termination equipment is reconfigured so as to function as a POTS line card.

6. A method as claimed in claim 4, wherein said line termination equipment is reconfigured so as to function as an analogue modem or an ISDN modem.

7. A method as claimed in claim 4, and including maintaining an analogue telephone call currently in progress on restoration of power to the customer premises equipment.

8. A method as claimed in claim 7, wherein detection of a POTS call currently in progress is determined by measurement of the line voltage.

9. A line terminating equipment for use in a voice over digital subscriber line (VoDSL) system in which the line terminating equipment is coupled via a subscriber loop to customer premises equipment having a subscriber loop port coupled via a VoDSL modem to a local telephony port so as to provide the customer with a lifeline voice service in the event of a customer premises equipment power supply failure, the line terminating equipment comprising a subscriber loop port for coupling to the subscriber loop, a network connection port; a voice-over digital subscriber loop modem circuit; and a direct electrical connection circuit; the equipment being arranged to operate in a first mode wherein a telecommunications connection is maintained between said subscriber loop port and said network connection port via said voice-over digital subscriber loop modem, and in a second mode wherein said modem is reconfigured to function as an analogue telephony line card so as to provide, in the event of a customer premises power failure, at least a voice service to the customer.

10. A line termination equipment arrangement according to claim 9, wherein a transition from said first mode to said second mode is effected responsive to receipt at said subscriber loop port of a signal indicative of power loss at equipment connected to said subscriber loop port.

11. A line termination equipment arrangement according to claim 9, wherein a transition from said second mode of operation to said first mode of operation is effected responsive to detection of power restoration.

12. A line termination equipment arrangement according to claim 9, wherein said transition from said second mode of operation to said first mode of operation is delayed responsive to detection of a call in progress in said second mode of operation during said power restoration.

13. A line termination equipment arrangement according to claim 9, wherein the equipment is reconfigurable so as to emulate a POTS line card.

14. A line termination equipment arrangement according to claim 9, wherein the equipment is reconfigurable so as to emulate an analogue modem or an ISDN modem.

* * * * *